Sept. 19, 1939. A. J. LEONARD 2,173,439
AUTOMOBILE PARKING MIRROR
Filed Dec. 3, 1936
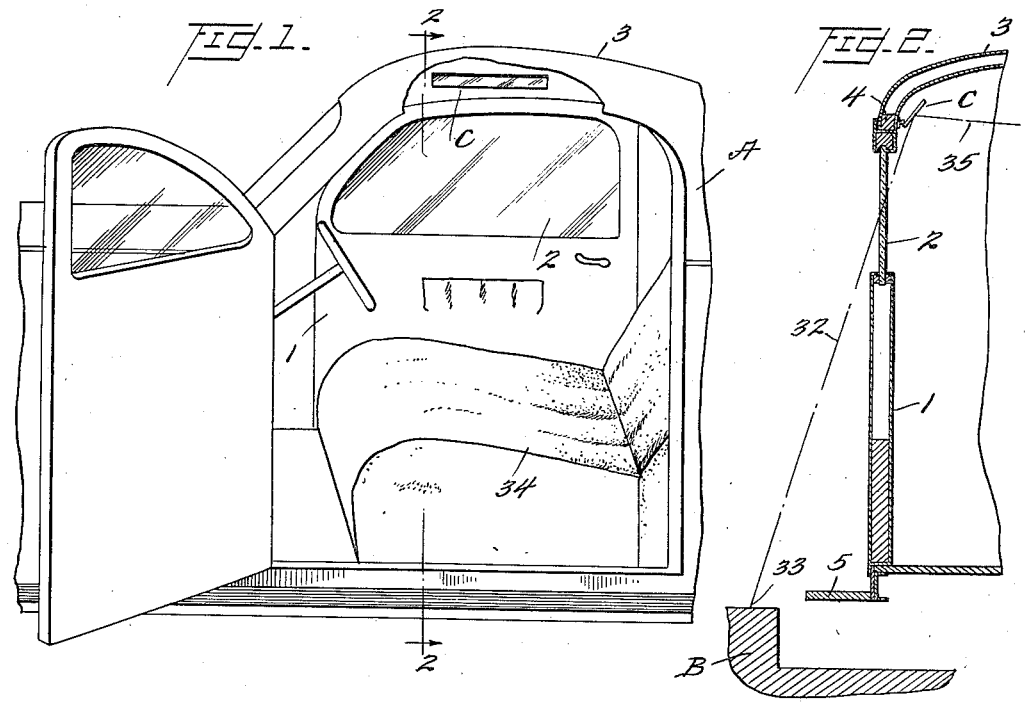
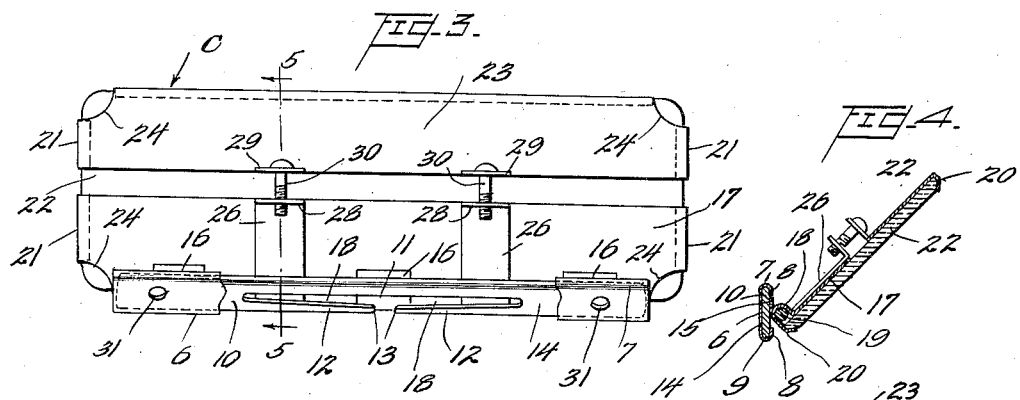
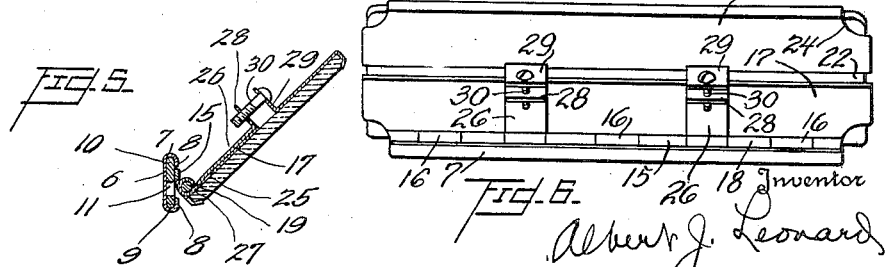
Inventor
Albert J. Leonard
By Shreve, Crowe & Gordon
Attorney Patented Sept. 19, 1939

2,173,439

UNITED STATES PATENT OFFICE 2,173,439

AUTOMOBILE PARKING MIRROR

Albert J. Leonard, La Canada, Calif.

Application December 3, 1936, Serial No. 114,067

4 Claims. (Cl. 248—284)

Generically this invention relates to mirrors, but is more especially directed to a unique type of automobile parking mirror and constitutes an improvement on my application Serial Number 93,467, filed July 30, 1936, for Automobile parking mirror.

While there are various types of mirrors employed in connection with automobiles by means of which a view to the rear of the automobile is presented so that the approach of the vehicles may be observed, no such device is capable of functioning as an aid in parking the car with respect to the curb, and therefore, one of the principal objects of this invention is the provision of, what may be termed, a parking mirror, so positioned that the driver is able to see the curb line as he parks the car without the necessity of leaving his seat.

Another important object of this invention is the provision of an automobile parking mirror adapted to be mounted above the right hand window so as to be invisible from the exterior of the car, and frictionally adjustable vertically to meet the requirements of different drivers and also adjustable longitudinally to position the angle of vision of a particular driver either slightly forwardly or rearwardly of the door of the automobile with respect to the line of vision with the curb, according to individual desires.

A further important object of this invention is the provision of a parking mirror of this character comprising a unique mirror holding frame structure adjustable to different width mirrors and permitting expeditious removal and replacement of the mirror and substitution in case of breakage of another mirror of the same or different width dimensions without removal of the supporting frame structure from the frame of the car.

Another and important object of this invention is the provision of an adjustable sectional mirror holding frame including a hinged mirror frame supporting section hingedly connected to a frictionally slidable plate or bar member, and an anchor channel member adapted for rigid connection with the automobile frame and adapted to frictionally receive said plate or bar member for adjustably mounting the mirror in the desired adjusted position.

A further important object of this invention is the provision of an automobile mirror holding frame structure of this character comprising a unique frictionally slidable plate or bar structure hingedly connected to one of the mirror frame sections and formed with expansible frictional fingers adapted for engagement in the rigidly supported anchor member, said bar and supported mirror frame being maintained in any desired arcuate or longitudinal adjustment with respect to the anchor member and, whereby, jarring loose or displacement of the mirror or frame during rough vehicular travel of the automobile is prevented.

A still further object of this invention is the provision of a sectional mirror holding frame and unique connecting means including independent spring tension portions anchored directly to the hinge pin which are adapted to effect expeditious tightening of the frame sections on the mirror without damage thereto and to maintain and preclude the same from becoming loose or rattling by reason of rough vehicular travel of the machine.

With these and other objects in view, which will become apparent as the description proceeds, the invention resides in the construction, combination, and arrangement of parts, hereinafter more fully described and claimed, and illustrated in the accompanying drawing, in which like characters of reference indicate like parts throughout the several figures, of which:

Fig. 1 is a fragmentary side elevation of an automobile body with the door in open position and parts broken away showing my improved parking mirror operatively positioned.

Fig. 2 is a transverse vertical section on the line 2—2 of Fig. 1 showing a portion of the curb and the line of vision from the mirror thereto.

Fig. 3 is a rear view of the device with portions of the anchor member broken away showing the friction finger structure.

Fig. 4 is a transverse section through the device and a solid portion of the frictional slide plate; and Fig. 5 is a similar view to Fig. 4 taken on the line 5—5 of Fig. 3.

Fig. 6 is a top plan view looking down on Fig. 4.

In the illustrated embodiment characterizing this invention there is shown an automobile body A, curb B, and mirror structure or assembly C.

The automobile body A is formed with the usual right hand door 1, window opening or transparent pane 2, top 3, top supporting frame or portion above said door 4, and running board 5, of conventional construction, and since such structure forms no part of the present invention it is deemed unnecessary to describe the same in detail.

While the structure illustrated in my co-pending application Number 93,467 constituted a distinct advance in the art, practice has demonstrated the necessity for certain desirable improvements in the detailed structural arrangement of parts and which has been accomplished by the structure forming the subject matter of this invention, and which will now be described in detail.

The improved mirror structure C comprises an anchor member 6 bent at right angles along its longitudinal edges as at 7 and inwardly in spaced parallelism with said member as at 8 to form channels 9 in which is adapted to be mounted in superimposed relation with respect to member 6 a frictional sliding plate 10 formed centrally of its length with a cut-out portion 11 adapted to form at one edge of the plate the integral compressible spring fingers 12 projecting toward each other in meeting direction and with their free ends 13 normally projecting above or out of the plane surface 14 of the plate so that when said plate 10 is inserted in anchor member 6, said fingers will be compressed within channel 9 and expansively engage one wall of said channel to maintain said member 10 in any desired adjusted position with respect to member 6 though permitting longitudinal adjustment of said plate with respect to anchor member 6, as will be well understood.

Spot welded or otherwise secured substantially centrally and longitudinally of plate 10 is the hinged strip section 15 adapted, when member 10 is mounted in anchor 6, to fit between the meeting edges of members 8 which form a further guide and reinforcing means for said member, as will be clear without further explanation. Said member 15 is formed with the shank or dovetail portions 16; a mirror holding section 17 is formed with corresponding dovetail shank portions 18 and said aligned dovetail shank portions 16 and 18 are connected by a hinge pin 19, as will be apparent. It is to be understood that there are a plurality of adjacent dovetail sections 16 and 18 extending throughout the length of members 15 and 17. Member 17 is formed at its edges with channel members 20 and with similar end channel clips 21 in which is inserted the mirror 22. Said section 17 is adapted to constitute the lower supporting section for the mirror 22 and a substantially similar section 23 is adapted to fit over the upper portion of mirror 22 and is formed with a similar channel member 20 and end channel members or clips 21 by bending the edges of said member outwardly and inwardly, as will be apparent without further description. In order to grippingly engage the sides and ends of the mirrors without binding at the corners and rendering it easy to disengage the section from the mirror, said sections are cut out at their respective corners as at 24, so as not to fracture the corners of the mirror.

Equi-distanced from each end the lower edge of section 17 is cut out as at 25 to permit one end of a spring attaching clip or strap 26 to be bent around hinge pin 19 forming a dovetail shank portion 27, similar to 16 above described. Said members 26 extend to a point flush with the upper edge of section 17 and then at right angles forming the end or lip portions 28 spaced from the corresponding end or lip portions 29 formed on the lower edge of section 23. Portions 28 and 29 are formed with aligned openings, the openings in sections 28 being threaded to receive the threaded screws 30, tightening of which screws draw said sections toward each other, binding clips 26 on section 17 and effectually locking the sections in gripping engagement with mirror 22, in such a manner as not to damage the mirror but at the same time hold it in rigid position with respect to said frame and mounting, when both sections 17 and 23 have been tightened, as will be clear without further description.

The anchor member 6 is formed adjacent its ends with countersunk openings 31 adapted to receive screws or other suitable fastening elements by means of which said anchor plate is securely fastened to member 4 substantially midway of door 1 immediately above the opening or transparent pane 2, and the mirror is longitudinally adjustable with respect to the opening 2 by simply sliding plate 10 with respect to member 6 so as to change the vision line 32 at point 33 with respect to the driver when seated in the driver's seat 34, as shown in Fig. 1, and the mirror is vertically adjustable about its hinged connection to raise or lower the line of vision 35 in accordance with the height of a particular driver.

It will be observed that I have designed a parking mirror longitudinally and vertically adjustable to control the lines of vision 32 and 35, respectively, to bring the edge of the curb B as at 33 immediately adjacent the car into full view of the driver without his having to move from his seat, thereby enabling quick and easy parking of the car without damage thereto and with comfort and safety to the driver.

Although in practice I have found that the form of my invention illustrated in the accompanying drawing and referred to in the above description as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A mirror mounting comprising sections adapted to embrace a mirror, a slide plate hinged to one of the sections, resilient fingers on the plate normally extending out of the general plane of said plate at its edge, and a channeled anchor plate telescopically engaging said first mentioned plate, said fingers being adapted to frictionally engage one of said channels to retain the plate in adjusted position.

2. A mirror mounting including upper and lower mirror engaging sections, a slide plate, means hingedly connecting the slide plate to the lower longitudinal edge of the lower section, said means including a hinge pin, a pair of straps having their lower ends frictionally engaging the hinge pin, and their upper ends bent to form lips, means to adjustably connect the lips and at the same time frictionally bind said hinge pin to retain said upper and lower sections in any desired angle with respect to said slide plate, a pair of resilient fingers struck from said slide plate and an anchor plate slideably engaged with said first mentioned plate, said anchor plate compressing said fingers, whereby the latter frictionally engage said anchor plate to retain said plate relative to the first mentioned plate.

3. A mirror mounting including upper and lower sections, a slide plate hingedly connected to the lower section, hinged elements including a hinge pin, a pair of straps having their lower ends frictionally engaging the hinge pin, means connecting the upper section and straps to adjust the sections and at the same time frictionally bind said hinge pin to retain said sections at any desired angle with respect to said slide plate, a channeled anchor plate formed to telescopically engage said slide plate, the two plates being relatively adjustable, and means to retain the plates in any desired adjusted position, said means including a pair of compressible fingers adapted to engage the wall of one of said channels.

4. A mirror mounting comprising an anchor member having channels, a frame section embracing the upper portion of the mirror and a similar frame section embracing the lower portion of the mirror, said lower frame section having cut-out portions at its lower edge, a slide plate, means hingedly connecting the slide plate to said lower frame section including a hinge pin, said slide plate being formed at one edge with compressible resilient fingers adapted, when the plate is slideably engaged in said channels, to expansibly engage the wall of one of said channels, strap elements having their lower ends extending into certain of said cut-out portions frictionally engaging the hinge pin and bindingly overlying the lower frame section, and means adjustably connecting said strap elements and upper frame section, whereby the frame section, mirror, and hinge pin connection between the lower section and slide plate are maintained in rigid adjusted position irrespective of rough vehicular travel.

ALBERT J. LEONARD.